(12) United States Patent
Broeker (10) Patent No.: US 10,543,727 B2
(45) Date of Patent: Jan. 28, 2020

(54) BALL JOURNAL WITH A PRESS ON ANNULAR BODY AND BALL JOINT WITH SAID TYPE OF BALL JOURNAL

(71) Applicant: ZF Friedrichshafen AG, Friedrichshafen (DE)

(72) Inventor: Klaus Broeker, Bohmte (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 51 days.

(21) Appl. No.: 15/744,335

(22) PCT Filed: Jun. 23, 2016

(86) PCT No.: PCT/EP2016/064582
§ 371 (c)(1),
(2) Date: Jan. 12, 2018

(87) PCT Pub. No.: WO2017/012820
PCT Pub. Date: Jan. 26, 2017

(65) Prior Publication Data
US 2018/0201082 A1    Jul. 19, 2018

(30) Foreign Application Priority Data
Jul. 21, 2015    (DE) .................. 10 2015 213 687

(51) Int. Cl.
*B60G 7/00*      (2006.01)
*F16C 11/06*     (2006.01)

(52) U.S. Cl.
CPC .............. *B60G 7/005* (2013.01); *B60G 7/008* (2013.01); *F16C 11/0604* (2013.01);
(Continued)

(58) Field of Classification Search
CPC .............. B60G 2204/416; B60G 7/005; B60G 2206/82092; F16C 11/0695
See application file for complete search history.

(56) References Cited

U.S. PATENT DOCUMENTS 2,182,601 A * 12/1939 Venditty .............. F16C 11/0628
                                                           403/37
6,287,040 B1   9/2001 Fischer
6,398,446 B1 * 6/2002 Pazdirek ................ B60G 7/001
                                                           403/122
(Continued)

FOREIGN PATENT DOCUMENTS

DE          4243042 A1 *  6/1994 .............. B60G 7/005
DE       197 47 931 C1    7/1999
(Continued)

OTHER PUBLICATIONS

German Search Report Corresponding to 10 2015 213 687.6 dated Oct. 25, 2016.
(Continued)

*Primary Examiner* — Nicole T Verley
(74) *Attorney, Agent, or Firm* — Davis & Bujold PLLC; Michael J. Bujold (57) ABSTRACT

A ball stud (21) for a ball joint (20) having an annular body (22) pressed onto the ball stud (21). The annular body (22) is held fast to the ball stud (21) by at least one circumferential securing element to prevent loosening, that acts between the ball stud (21) and the annular body (22) and is in the form of a deformation edge (23). The at least one deformation edge (23) is formed integrally with the ball stud (14). A ball joint (20) that has a housing (36) in which a ball stud (21) is held.

16 Claims, 6 Drawing Sheets

(52) U.S. Cl.
CPC .... *F16C 11/0695* (2013.01); *B60G 2204/148* (2013.01); *B60G 2204/416* (2013.01); *B60G 2206/82092* (2013.01); *F16C 2326/05* (2013.01)

(56) References Cited

U.S. PATENT DOCUMENTS

| | | | | |
|---|---|---|---|---|
| 7,097,381 | B2* | 8/2006 | Sieve | B60G 7/005 |
| | | | | 403/123 |
| 7,393,152 | B2* | 7/2008 | Sellers | B60G 7/005 |
| | | | | 403/135 |
| 7,405,557 | B2* | 7/2008 | Spratte | B60G 7/005 |
| | | | | 324/207.22 |
| 9,309,919 | B2* | 4/2016 | Staade | F16C 11/0671 |
| 2008/0213035 | A1 | 9/2008 | Scheper | |
| 2015/0217614 | A1* | 8/2015 | Aoki | F16C 11/083 |
| | | | | 403/133 |

FOREIGN PATENT DOCUMENTS

| | | | | |
|---|---|---|---|---|
| DE | 10 2005 025 551 | A1 | 12/2006 | |
| DE | 10 2007 011 360 | A1 | 9/2008 | |
| DE | 10 2012 219 101 | A1 | 4/2014 | |
| DE | 102013105808 | A1 * | 12/2014 | ............. B60G 7/005 |
| DE | 102015208412 | A1 * | 11/2016 | ............. B60G 7/005 |
| JP | 2004-286161 | A | 10/2004 | |
| WO | WO-2011025414 | A1 * | 3/2011 | .......... F16C 11/0604 |
| WO | WO-2018108418 | A1 * | 6/2018 | ............. B60G 7/005 |

OTHER PUBLICATIONS

International Search Report Corresponding to PCT/EP2016/064582 dated Jun. 27, 2017.
Written Opinion Corresponding to PCT/EP2016/064582 dated Jun. 27, 2017.

* cited by examiner

BALL JOURNAL WITH A PRESS ON ANNULAR BODY AND BALL JOINT WITH SAID TYPE OF BALL JOURNAL

This application is a National Stage completion of PCT/EP2016/064582 filed Jun. 23, 2016, which claims priority from German patent application serial no. 10 2015 213 687.6 filed Jul. 21, 2015.

FIELD OF THE INVENTION

The invention concerns a ball stud with a press on annular body and a ball joint with such a ball stud.

BACKGROUND OF THE INVENTION

Ball studs for fitting into ball joints and having a press on annular body are known from the prior art, such that the annular body can for example be in the form of a bevel washer. The annular body serves to increase the contact area between the ball stud and a first connected component made from a material with lower strength than the material of the annular body. For example, the first connected component can be a transverse control arm made as an aluminum casting, which in the assembled condition is in contact with the annular body, for example made of steel, over the contact area between the two. By increasing the contact area between the first connected component made from a material with relatively low strength and the annular body made from a material with a relatively higher strength, the surface pressure in the contact area can be reduced to a value which, for the load situation concerned, is within the acceptable limit value for the material of the first connected component, i.e. the material with lower strength.

With reference to the structure of the press on connection between the ball stud and the annular body, various designs are known. DE 10 2012 219 101 A1 describes an annular body which at its inner circumference is provided integrally with a circumferential deformable edge which, after being pressed onto the ball stud, is in contact with the outer circumference of the ball stud and thereby acts as a securing element to prevent loosening. In this case, the annular body can be made as an extrusion-molded component by deformation, such that due to the nature of the process the deformable edge has to be produced by an additional work step, in particular by turning.

SUMMARY OF THE INVENTION

The purpose of the present invention is to provide an assembly in the form of a ball stud with an annular body pressed onto it, which can be made inexpensively and by a reliable process.

According to the present invention that objective is achieved by a ball stud of the type in question, which also embodies the characterizing features specified in the independent claims.

Preferable embodiments and further developments are the object of the subordinate claims.

Accordingly, the invention provides a ball stud for a ball joint with an annular body pressed onto the ball stud, wherein the annular body is fixed onto the ball stud by at least one circumferential securing element in the form of a deformation edge to prevent loosening that acts between the ball stud and the annular body. According to the invention, the at least one deformation edge is formed integrally with the ball stud.

The invention is based on the recognition that outer contours such as the deformation edge formed integrally with the ball stud can be produced with less machining effort and at the same time reliably and with closer production tolerances than can inner contours. This basic concept is also reflected for example in the unit bores fitting system according to DIN 7154. Furthermore, by virtue of the solution according to the invention quality control is facilitated because measurement of the internal diameter of a deformation edge known from the prior art, which is formed integrally with the annular body, is significantly more difficult than measurement of the outer diameter of the deformation edge according to the invention which is formed integrally with the ball stud.

By virtue of the surrounding deformation edge, whose outer diameter is larger than that of the corresponding inner diameter of the annular body, a dimensional overlap between the annular body and the ball stud is provided. Compared with the total height of the annular body, the deformation edge has a relatively small thickness in the direction of the central axis of the ball stud, and can therefore be deformed relatively easily when the annular body is pressed onto the ball stud. The ball stud and the annular body are preferably made of steel; the ball stud in particular of tempered steel. Perpendicularly to the central axis of the ball stud, the deformation edge projects all round by about 0.1 to 0.3 millimeters relative to the adjacent areas of the ball joint in the direction of the central axis. Among other things that size depends on the diameter of the areas adjacent to the deformation edge. For example, the adjacent areas on both sides of the circumferential deformation edge can have a diameter of 14.8 millimeters and the deformation edge itself can be made with a maximum outer diameter of 15.1 millimeters. Thus, in such a case the deformation edge projects by 0.15 millimeters all round. During the pressing on process of the annular body, the deformation edge lies along the ball stud against the inside wall of the annular body.

Once the annular body has been pressed onto the ball stud, there are zones in the area of the deformation edge which have been deformed both plastically and elastically. The plastically deformed zones ensure, as it were, tolerance compensation between the outer circumferential surface of the ball stud and the inner circumferential surface of the annular body. The elastically deformed zones ensure that the annular body is held onto the ball stud by friction force, so that the annular body is held firmly on the ball stud by the deformation edge which has the function of a securing element to prevent loosening. Thanks to this friction-force connection, any undesired loosening of the annular body from the ball stud, for example during transport or during assembly, is effectively prevented. If the ball stud and the annular body are connected only in the area of the deformation edge by a press fit, then also in that area only the annular body experiences a force acting upon it radially by virtue of the press fit. That force, or the tensile stresses produced by it within the annular body, are much lower than in a design with a press fit between the ball stud and the annular body that extends completely over the full height of the annular body. For that reason, when the ball joint is bolted onto a connected component with the annular body pressed onto the ball stud only in the area of the deformation edge, it is possible to work with a comparatively higher pre-stress force in the axial direction of the ball stud. Previously, the pressing force for pressing the annular body onto the ball stud was applied in an assembly device exclusively by way of the ball stud and the annular body in order to avoid damaging other components of the ball joint.

Due to the closer manufacturing tolerances required when the deformation edge and the ball stud are formed integrally, it becomes possible to maintain the scatter of force needed for pressing the annular body onto the ball stud reliably within relatively narrow limits. This enables the pressing force to be applied via a housing that encloses the ball stud at one end, without thereby damaging other components of the ball joint. During the pressing on of the annular body, the housing can be fixed, for example in a holding device for assembly. The area clamped by the deformation edge preferably extends perpendicularly to the central axis of the ball stud. The ball stud can have one deformation edge or even a plurality of deformation edges located a distance apart in the direction of the central axis of the ball stud, which are preferably arranged parallel to one another.

Preferably, the deformation edge is produced by a machining process, in particular by turning. The starting material for the production of ball studs consists of blanks which are produced by a deformation process such as extrusion molding or forging. The blanks have to be at least partially machined in order to satisfy the requirements relating to manufacturing tolerances and surface quality. In the areas intended for finish-machining, like the deformation edges, the blanks are only slightly oversized so that machining can be done in a single working step. With reference to turning, in this connection one speaks of so-termed one-cut machining, i.e. finish-turning of the machined area in just one operation. Ball studs as a rule have to be finish-machined by turning in the area of a groove for the subsequent fitting of a sealing bellows. To turn the deformation edge as well during that working step incurs only little additional effort, with an additional process time of the order of an extra second. This offers a particular economic advantage compared with known methods for producing securing elements to prevent loosening between the ball stud and the annular body, for which in each case separate working steps with additional operating equipment and the consequent additional fitting, handling and transport times are needed. The final machining of the deformation edges by turning, particularly on an automatic lathe, also has the advantage that in the manner of the previously mentioned unit bore fitting system the outer diameter of the deformation edge can be adapted to a given inner diameter of the annular body. This makes it possible, for example to react flexibly to inner diameters of the annular body that may vary from one batch to the next.

Advantageously, as viewed in a longitudinal section through the central axis of the ball stud, the deformation edge is shaped like a barbed hook. This is achieved in that due to its geometrical form in the pressing-on of the annular body, the deformation edge has a lower resistance to deformation than in the opposite direction. In particular, as viewed in the pressing-on direction the deformation edge has ahead of its maximum diameter in the undeformed condition a relatively flatly rising oblique surface like a ramp, which facilitates the pressing-on of the annular body. In contrast, behind the maximum diameter of the deformation edge the diameter of the deformation edge decreases relatively steeply, which enables a desired deformation during the pressing-on of the annular body.

According to a further development of the invention, the ball stud has at least one recess for receiving at least a partial volume of the deformation edge when the annular body is pressed on. In particular, the recess is shaped such that when the annular body is pressed on, it is only essentially filled completely when the inside diameter of the annular body corresponds to the outer diameter of the ball stud, i.e. when the recess has to receive the maximum possible volume of the deformation edge. Thus, the recess has the advantage that in relation to the inside diameter of the annular body it acts to compensate tolerances. Expediently, as viewed in the pressing-on direction of the annular body the recess is arranged behind the deformation edge. Depending on the number of deformation edges, the ball stud can have one or more recesses for receiving at least part of the deformation edge.

In an advantageous further development the recess is in the form of a circumferential annular groove. The circumferential annular groove can be produced particularly appropriately in one working step together with the deformation edge by turning, in particular on an automatic lathe. Depending on the number of deformation edges the ball stud can also have a plurality of annular grooves.

To avoid notch effects, the annular groove is advantageously produced in a tangentially consistent manner in the extension direction of the central axis. In the context of the present invention a tangentially consistent form is understood to mean a shape without edges or, to put it differently, a shape free from sharp corners. In contrast for example to rectangular grooves for locking rings for bores according to DIN 472, bending loads of the ball stud do not result in marked stress peaks in the area of the annular groove if it is tangentially consistently shaped.

Preferably, when the annular body has been pressed on, the ball stud and the annular body have an essentially cylindrical area extending in the direction of the central axis, such that in the cylindrical area there is a clearance fit between the ball stud and the annular body. In the area of the annular groove, due to the inwardly inclined geometry of the annular groove there is then a clearance fit with a larger clearance. In a small part-area the cylindrical area is interrupted by the surrounding, outwardly inclined deformation edge. Despite these deviations from a theoretically exact cylindrical shape, which are small relative to the total extension of the cylindrical area, one can speak here of a cylindrical area. In the cylindrical area, when the annular body has been pressed on completely in place the ball stud and the annular body are only in contact in the area of the surrounding deformation edge. The clearance fit ensures that while the annular body is being pressed on, the ball stud with its deformation edge can fit closely in the cylindrical area against the inside wall of the annular body in an optimum manner.

According to a further development, the ball stud and the annular body contact one another along a contact surface shaped like the lateral surface of a truncated cone. This contact surface is only formed when the annular body is fully pressed into place and constitutes an end-stop for the process of pressing the annular body onto the ball stud. Consequently, in the area of the contact surface the ball stud and the annular body have shape-fitting mating surfaces which form a seal in the contact area. Besides their contact in the area of the contact surface, there is a further extensive contact between the ball stud and the annular body in the area of the deformation edge. The component geometries of the ball stud and the annular body are advantageously designed such that in the assembled condition of the ball joint the main contact area between the ball stud and the annular body is in the outer diameter area of the contact surface. In this way, compared with an arrangement with the main contact area in the inner diameter area of the contact surface, the surface pressure between the ball stud and the annular body in the area of the contact surface is reduced. The design of the contact surface like a lateral surface of a truncated cone has the advantage that in combination with the previously described clearance fit in the cylindrical area, it acts to compensate tolerances. Since due to the clearance fit a slight tilting of the annular body about the deformation edge is possible, the annular body and the ball stud can be brought into optimal contact in the area of the contact surface and a possibly necessary slight tolerance compensation, for example caused by a slight deviation from the specified shape and position tolerances, can be compensated for in the cylindrical area. The contact surface associated with the ball stud is preferably a surface produced by a cutting process, in particular by turning.

Advantageously, the cylindrical area associated with the ball stud and the contact surface associated with the ball stud are produced by turning in a single clamping operation, particularly together with the previously described groove for receiving the sealing bellows. In this way high precision in relation to the position of these two surfaces relative to one another can be achieved, with the aim of ensuring an optimum contact pattern for accommodating the main contact area in the outer diameter area of the contact surface. Moreover, the machining of the contact surface associated with the ball stud and of the cylindrical area associated with the ball stud provides the possibility of adjustment, for example in order to be able to compensate for geometrical deviations of the annular body.

Preferably, as viewed in the direction of the central axis the deformation edge is positioned essentially in the middle of the cylindrical area. The arrangement of the deformation edge in the middle of the cylindrical area has the advantage that the purpose of the deformation edge, namely to provide a securing element to prevent loosening, can be reliably fulfilled. Even if the annular body should be displaced slightly on the ball stud, the securing element to prevent loosening still holds fast because it has been pressed on by an amount approximately half the length of the cylindrical area. On the other hand, however, the annular body must not be pushed on by an amount corresponding to the full length of the cylindrical area in the pressing-on direction, as would for example be necessary for press-fitting over the full length of the cylindrical area. Positioning the deformation edge in the middle of the cylindrical area is, moreover, advantageous in relation to the previously described tolerance compensation effect. Furthermore, a deformation edge positioned in the middle of the cylindrical area has the advantage that in its condition pressed onto the ball stud, the annular body is more stable than in the edge area in the direction of the central axis of the ball stud. If the circumferential force exerted by the deformation edge on the annular body were to act on the edge areas of the annular body, there would be a risk that the annular body might undergo unwanted deformations in those areas. Such undesired deformations could spread to the connection surfaces of the annular body with adjacent components and result in undesired deformations there as well. That could reduce the load-bearing ability of the connection surfaces. That risk does not exist if the deformation edge is positioned in the middle of the cylindrical area, thanks to the shape stability of the annular body in the corresponding contact area.

Due to the clearance fit between the ball stud and the annular body, at the end of the cylindrical area opposite the contact surface, an open annular gap is formed between the ball stud and the annular body. To avoid corrosion in the cylindrical area, the opening of this circumferential gap is closed by a further deformation edge connected integrally with the ball stud in the area of the opening. Since that deformation edge acts only as a seal, it is preferably less pronounced, i.e. formed with a smaller dimensional overlap than the deformation edge arranged in the middle of the cylindrical area.

Advantageously, when the annular body is fully pressed on, the ball stud has a surface provided with an electroplated surface protection, at least in the overlap area between the ball stud and the annular body. The overlap area corresponds to the height of the annular body. The electroplated surface protection in the overlap area protects the cylindrical area of the ball stud against corrosion. This is important, especially in the area of the circumferential gap formed between the ball stud and the annular body, because due to capillary action moisture and, depending on the design of the fitting space in the vehicle, possibly also corrosive media such as sprayed water with road salt dissolved in it can penetrate into the gap. Furthermore, the electroplated surface protection is necessary in order to withstand the 720-hour salt-spray test often demanded in the automotive branch. The electroplated surface protection is in particular in the form of a zinc-nickel surface protection coating.

In an advantageous further development the annular body is in the form of a simple shaped component, in particular an extrusion-molded component. A design in the form of a simple shaped component means that the annular body is made, ready to fit, exclusively by a deformation process. In particular, the shaped component is one produced by cold forming.

Cold-formed components, such as cold extrusion molded components, can be produced reliably with relatively close component tolerances. The design of the annular body as a simple shaped component enables it to be produced inexpensively, particularly because no further working step such as additional turning is required. Slight fluctuations of the inside diameter of the annular body in the cylindrical area can be compensated for by the deformation edge, which carries out its function as a securing element to prevent loosening regardless of whether it has been deformed slightly more or slightly less while being pressed onto the ball stud.

Expediently, the annular body is provided with surface protection, in particular an electroplated coating, all over its surface. The all-over surface protection of the annular body serves the purpose of general corrosion protection, for example in order to be able to withstand the aforesaid 720-hour salt-spray test. The electroplated surface protection is in particular in the form of a zinc-nickel surface coating. Since the annular bodies can be electroplated as so-termed drum goods, i.e. without having to fix them on a jig, the coating costs are relatively low.

In an advantageous design, the annular body has a contact surface to a first connected component, which surface is in the form of a lateral surface of a truncated cone, a spherical cap or a circular surface. The form of the contact surface is determined by the form of the corresponding contact surface of the first connected component. An annular body with a contact surface in the form of a lateral truncated cone surface is also called a bevel washer. Analogously, a cup washer has a curved surface of a section of a sphere in the manner of a spherical cap, and a flat washer has a circular contact surface. The main bearing load, which acts upon the annular body through the first connected component, should preferably be transferred to the outer diameter area of the connected component in order to keep the surface pressure between the annular body and the first connected component low. Based on the previously described background regarding the use of annular bodies, namely enlarging the contact surface between the ball stud and the first connected component made of a material whose strength is lower than that of the material of the annular body, the first connected component is advantageously made of an aluminum material, in particular a cast aluminum material. In the material combination of a steel annular body with a first connected component of aluminum, the all-over surface coating of the annular body also serves to avoid contact corrosion in the area of the contact surface, since at that point two different resistant metals are in contact. The first connected component can for example be a wheel carrier or a steering component, in particular a transverse control arm.

The invention also concerns a ball joint comprising a housing which holds a ball stud as described above. In particular, the ball stud is held at one end in the housing in such manner that it can rotate and pivot. For this, the end of the ball stud is spherically shaped.

In an advantageous design, the housing has an outer circumferential surface suitable for the housing to be held in a bore of a second connected component. By integrating the function "holding of the housing in a bore of a second connected component" in the outer circumferential surface of the housing, an inexpensive ball joint is obtained. Preferably, the ball stud, the annular body and the housing are all rotationally symmetrical relative to the central axis of the ball stud. The second connected component can for example be a wheel carrier or a steering component, in particular a transverse control arm.

BRIEF DESCRIPTION OF THE DRAWINGS

Below, the invention is explained in more detail with reference to drawings that illustrate only one example embodiment, in which drawings the same indexes refer to the same components or elements. The figures show.

DETAILED DESCRIPTION OF THE PREFERRED EMBODIMENTS

Figure 1:
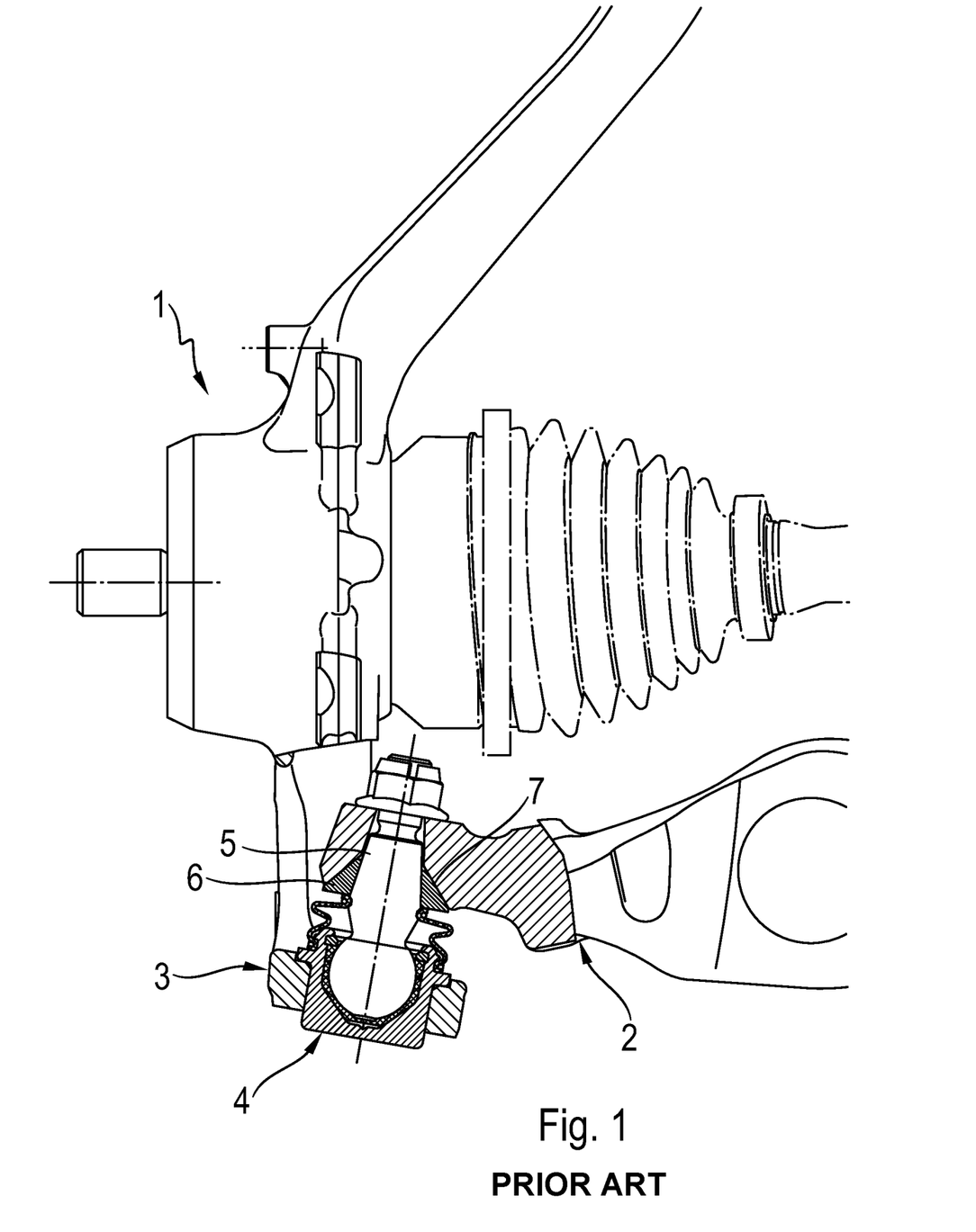
FIG. 1: An overall representation of a chassis assembly, according to a first design of the prior art.

FIG. 1 shows a chassis assembly 1 known from the prior art, which comprises a first connected component 2 in the form of an aluminum transverse control arm and a second connected component 3 in the form of a wheel carrier. A bore of the wheel carrier 3 holds a ball joint 4 with a ball stud 5, onto which is pressed an annular body 6 in the form of a bevel washer. In this case the annular body 6 serves to enlarge a contact surface 7 with the aluminum transverse control arm 2, whose strength is lower than that of the material, in this case steel, of the annular body 6. By enlarging the contact area 7 between the aluminum transverse control arm 2 and the steel annular body 6, the surface pressure in the area of the contact surface 7 is reduced to a value which is within the acceptable limit value for the load situation of the aluminum transverse control arm 2 concerned, this being the material with lower strength.

Figure 2:
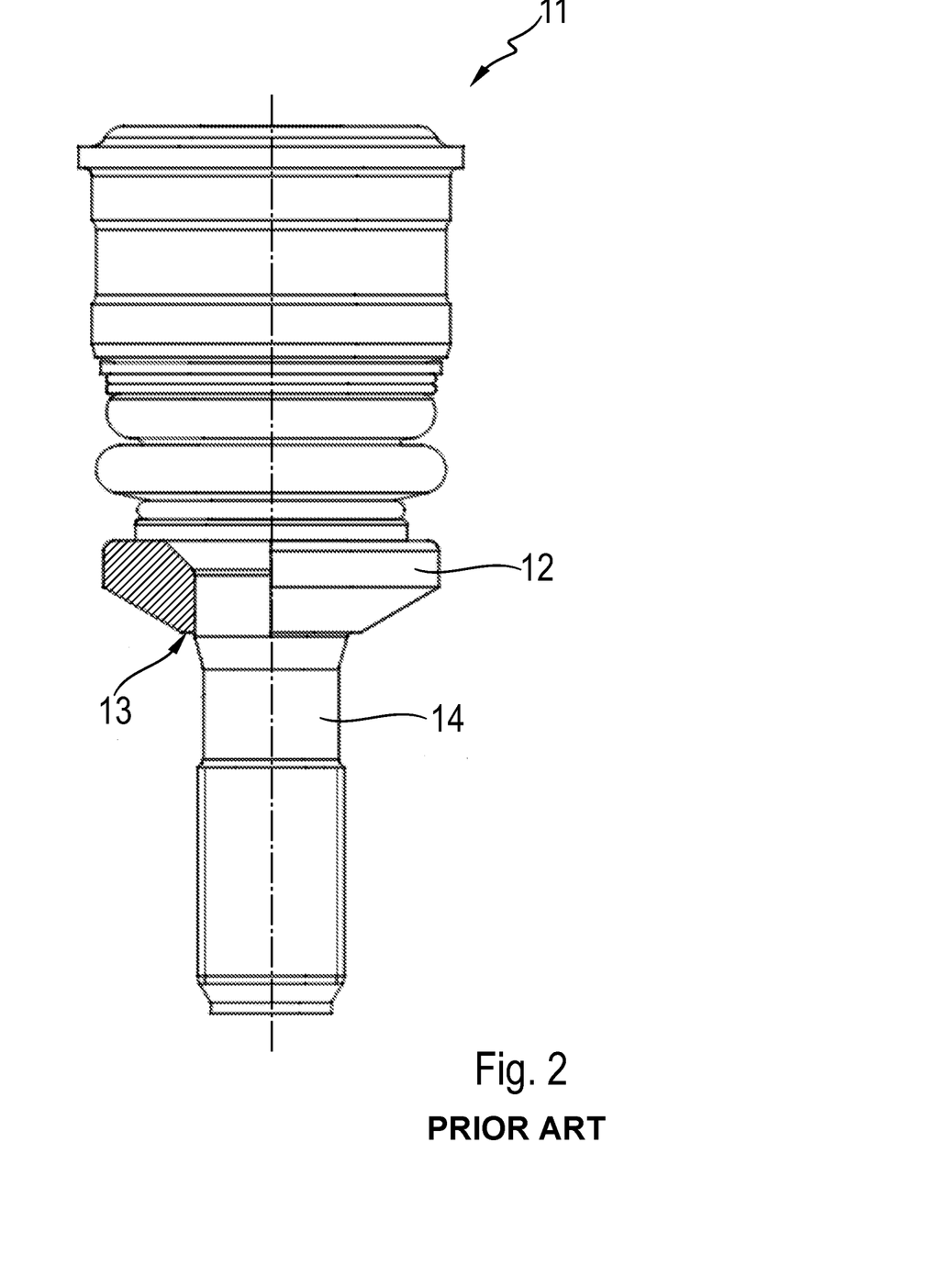
FIG. 2: A ball joint according to a second design of the prior art.

FIG. 2 shows a further ball joint 11 also known from the prior art, with an annular body 12 which at its inside circumference is provided integrally with a surrounding deformation edge 13. After the annular body has been pressed onto a ball stud 14 of the ball joint 11, the deformation edge rests against the outer circumference of the ball stud 14 and thereby acts as a securing element to prevent loosening which prevents the annular body 12 from working loose from the ball stud 14. The annular body 12 is in the form of an extrusion molded component on which the deformation edge 13 is produced by an additional turning step.

Figure 3:
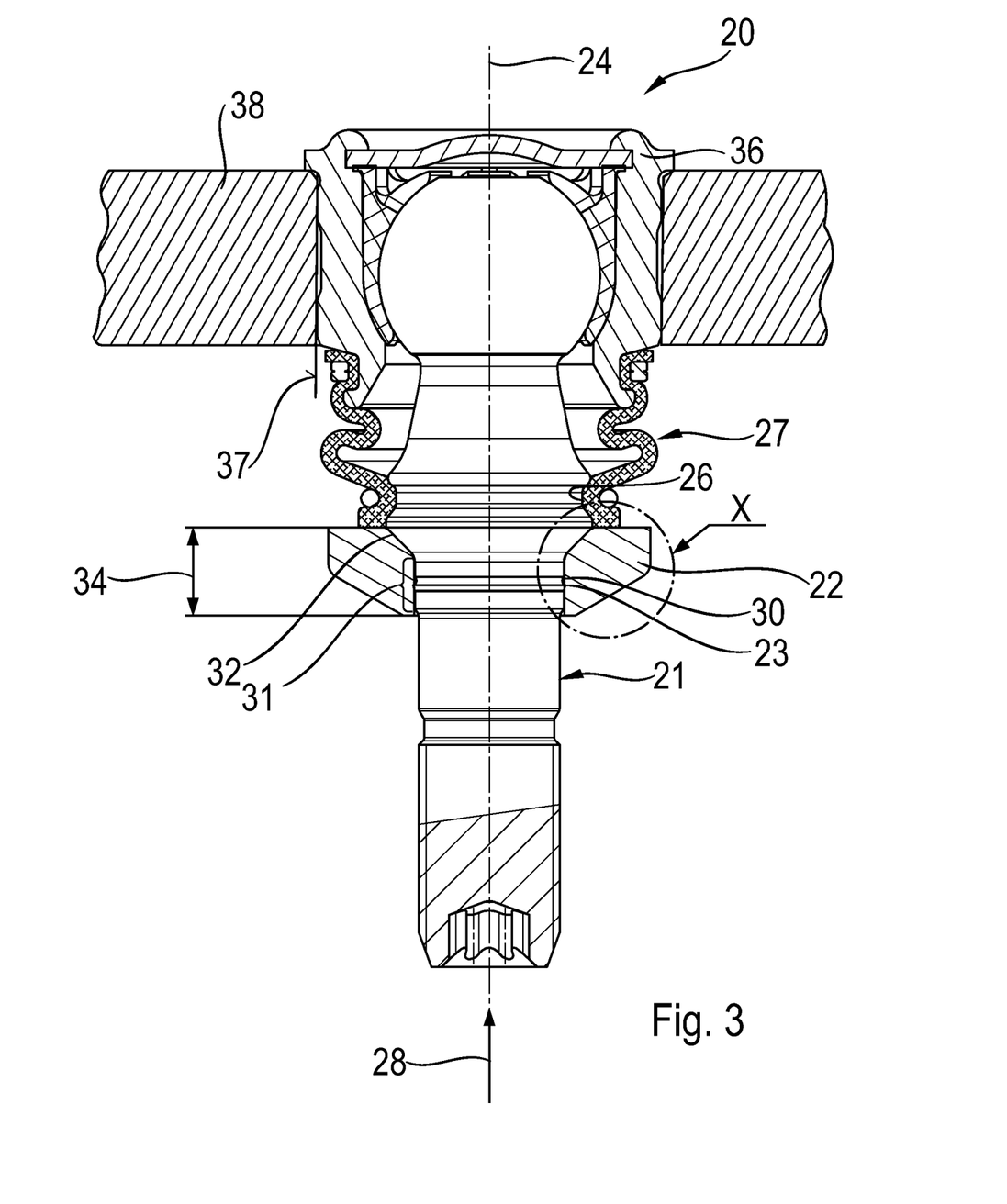
FIG. 3: A ball joint with a ball stud according to the invention, viewed in section.

FIG. 3 shows a ball joint 20 with a ball stud 21 and an annular body 22 pressed onto the ball stud 21, such that the annular body 22 is fixed onto the ball stud 21 by a securing element to prevent loosening, in the form of a circumferential deformation edge 23 acting between the ball stud 21 and the annular body 22. The deformation edge 23 is formed integrally with the ball stud 21. Due to the circumferential deformation edge 23, which has a larger outer diameter than the corresponding inside diameter of the annular body 22, a dimensional overlap between the annular body 22 and the ball stud 21 is produced. Compared with the total height of the annular body 22 the deformation edge 23 has a relatively small thickness in the direction of the central axis 24 of the ball stud 21 and can therefore be deformed relatively easily when the annular body 22 is pressed onto the ball stud 21. Perpendicularly to the central axis 24 of the ball stud 21, the deformation edge 23 projects all round by 0.15 millimeters relative to the adjacent areas in the direction of the central axis 24 of the ball stud 21, which have a diameter of 14.8 millimeters. During the press-fitting process of the annular body 22 onto the ball stud 21, the deformation edge 23 rests against the inside wall 25 of the annular body 22. The press-fitting takes place in a pressing direction 28 that extends along the central axis 24 of the ball stud 21.

When the annular body 22 has been pressed onto the ball stud 21, there are both plastically and elastically deformed zones in the area of the deformation edge 23. The plastically deformed zones ensure, as it were, tolerance compensation between the outer circumferential surface of the ball stud 21 and the inside circumferential surface of the annular body 22. The elastically deformed zones ensure that the annular body 22 is held firmly by friction force on the ball stud 21, so that the annular body 22 is fixed onto the ball stud 21 by the deformation edge 23 which functions as a securing element to prevent loosening. Thanks to this friction-force connection an undesired loosening of the annular body 22 from the ball stud 21, for example during transport or in the course of assembly, is effectively prevented. The surface clamped by the deformation edge 23 extends perpendicularly to the central axis 24 of the ball stud 21. The deformation edge 23 is produced in a turning operation of the ball stud 21 during which, in the same working step, a groove 26 for receiving a sealing bellows 27 is also produced adjacent to the annular body 22 in the direction of the central axis 24 of the ball stud 21.

Figure 4:
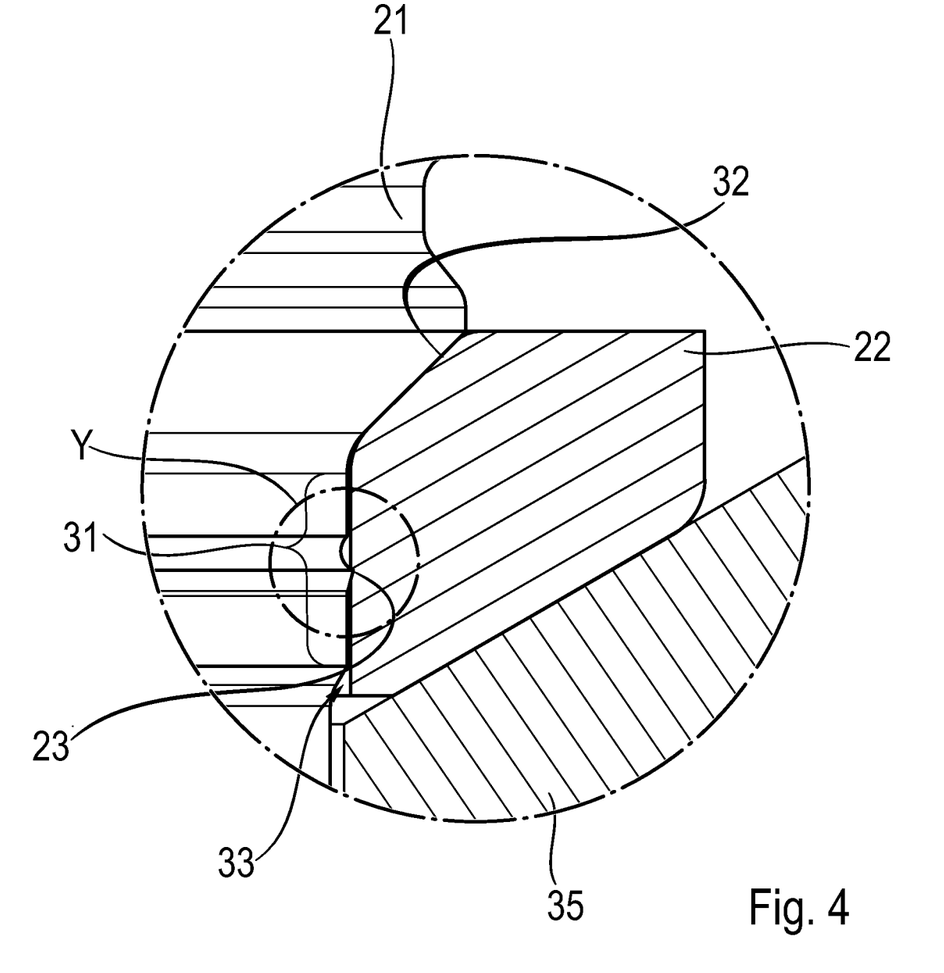
FIG. 4: An enlarged detail view of the area X in FIG. 3.
Figure 5:
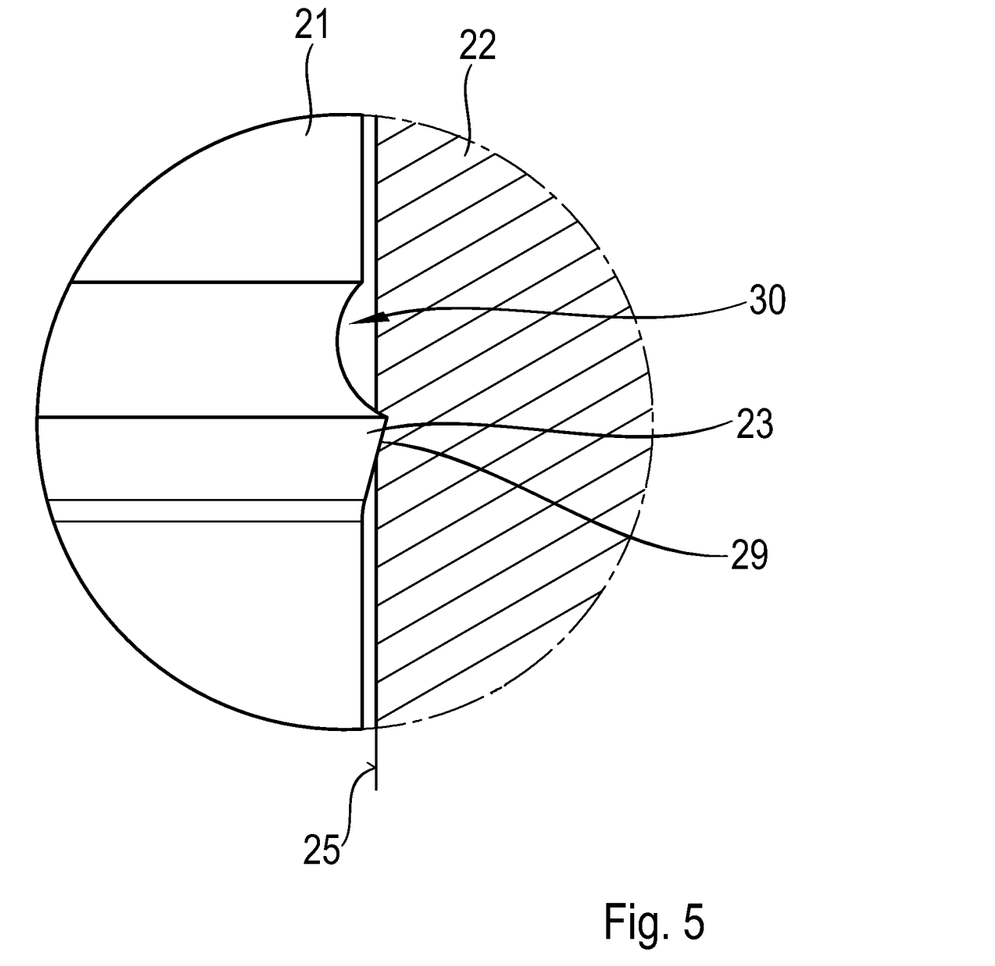
FIG. 5: An enlarged detail view of the area Y in FIG. 4, in which the sealing bellows is not shown.

In FIGS. 4 and 5 it can be seen that as viewed in a longitudinal section through the central axis 24 of the ball stud 21, the deformation edge 23 is shaped like a barbed hook. This is achieved in that due to its geometrical form, the deformation edge 23 has a lower resistance to deformation in the pressing-on direction 28 than in the opposite direction. For that, as viewed in the pressing-on direction 28 the deformation edge has ahead of its maximum diameter in the undeformed condition a relatively flatly rising oblique surface 29 like a ramp, which facilitates the pressing-on of the annular body 22. In contrast, behind the maximum diameter of the deformation edge 23 the diameter of the deformation edge 23 decreases relatively steeply. As can also be seen, the ball stud 21 has a recess 30 for receiving a partial volume of the deformation edge 23 when the annular body 22 has been pressed in place. The recess 30 is designed such that when the annular body 22 is pressed home, the recess is only filled essentially completely if the inside diameter of the annular body 22 corresponds to the outer diameter of the ball stud 21, i.e. when the recess 30 has to receive the maximum possible volume of the deformation edge 23. In that case the inside wall 25 of the annular body 22 would contact the corresponding circumferential surface of the ball stud 21. Thus, the recess 30 has the advantage in relation to the inside diameter of the annular body 22 that it acts to compensate tolerances. As viewed in the pressing-on direction 28 of the annular body 22, the recess 30 is arranged behind the deformation edge 23. According to this example embodiment, the recess is in the form of a circumferential annular groove 30. The circumferential annular groove 30 is produced in the same working step as the deformation edge 23 by turning on an automatic lathe. To avoid notch effects the annular groove 30 is shaped in a tangentially consistent manner in the extension direction of the central axis 24 of the ball stud 21.

Figure 6:
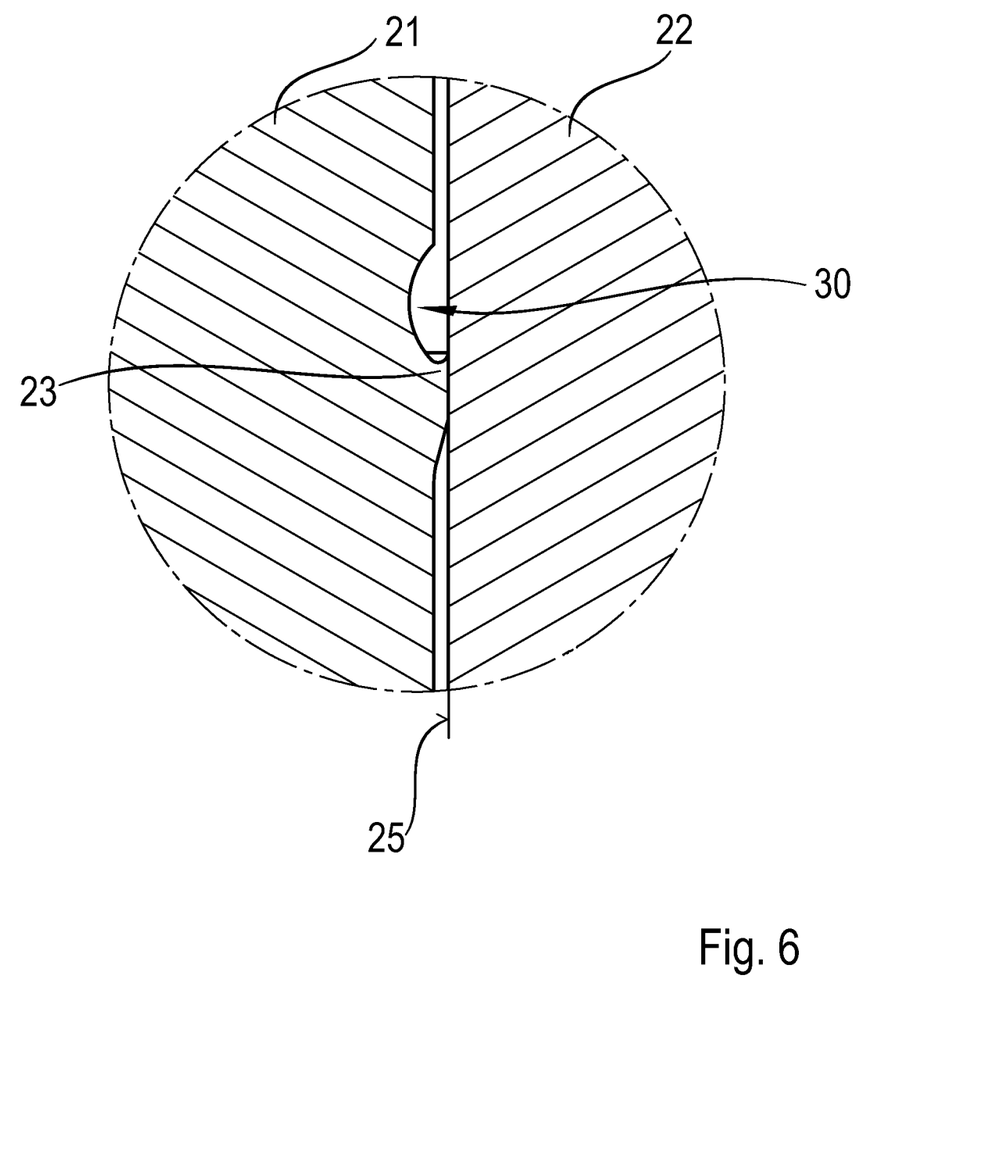
FIG. 6: An enlarged detail view similar to FIG. 5, with the deformation edge shown in its deformed condition.

For clarification, in FIGS. 3 to 5 the deformation edge 23 is in each case shown in its undeformed condition. FIG. 6, however, shows the deformation edge 23 in its deformed condition after the annular body 22 has been pressed onto the ball stud 21.

When the annular body 22 has been pressed home, the ball stud 21 and the annular body 22 have a cylindrical area 31 extending in the direction of the central axis 24, such that in the cylindrical area 31 there is a clearance fit between the ball stud 21 and the annular body 22. In the area of the annular groove 30, owing to the inward-inclined geometry of the annular groove 30 the clearance fit has a larger clearance. In a small part-area the cylindrical area 31 is interrupted by the surrounding, outward-inclined deformation edge 23. In the cylindrical area 31, when the annular body 22 has been pressed fully home the ball stud 21 and the annular body 22 are only in contact in the area of the surrounding deformation edge 23. The clearance fit ensures that during the pressing-on of the annular body 22, the ball stud 21 can make optimum close contact with the inside wall 25 of the annular body 22 with its deformation edge 23 in the cylindrical area 31.

As can also be seen in FIG. 3, the ball stud 21 and the annular body 22 are in mutual contact, with the formation of a contact surface 32 formed in the manner of an outer surface of a truncated cone. This contact surface is only formed when the annular body 22 has been pressed fully home, and forms an end-stop for the pressing-on process of the annular body 22. In the area of the contact surface 32 the ball stud 21 and the annular body 22 have shape-matched mating faces which meet to form a seal in the area of the contact surface 32. Besides the contact in the area of the contact surface 32, there is another circumferential contact between the ball stud 21 and the annular body 22 in the area of the deformation edge 23. The component geometries of the ball stud 21 and the annular body 22 are matched to one another in such manner that in the assembled condition of the ball joint 20, the main contact area between the ball stud 21 and the annular body 22 is in the outer diameter area of the contact surface 32. In this way, compared with an arrangement having the main contact area in the inner diameter area of the contact surface 32, the surface pressure between the ball stud 21 and the annular body 22 in the area of the contact surface 32 is reduced. The formation of the contact area 32 in the shape of the outer surface of a truncated cone has the advantage that in combination with the above-described clearance fit in the cylindrical area 31, a tolerance-compensating effect is achieved. The finished surface of the ball stud 21 in the cylindrical area 31 and in the area of the contact surface 32 is produced by turning in a single clamping operation, together with the groove 26 for holding the sealing bellows 27.

As viewed in the direction of the central axis 24 of the ball stud 21, the deformation edge 21 is positioned approximately in the middle of the cylindrical area 31. Arranging the deformation edge 23 in the middle of the cylindrical area 31 has the advantage that the purpose of the deformation edge 23, namely to provide a securing element to prevent loosening, can be reliably fulfilled. Even if the annular body 22 should be displaced slightly on the ball stud 21, the securing element to prevent loosening still holds fast because it is pressed down onto the ball stud 21 by about half the length of the cylindrical area 31.

Owing to the clearance fit between the ball stud 21 and the annular body 22, at the end of the cylindrical area 31 opposite the contact surface 32 there is an outward-opening annular gap between the ball stud 21 and the annular body 22, as can be seen clearly in FIGS. 4 to 6. The opening 33 of the annular gap can be closed in order to prevent corrosion inside the cylindrical area 31, by providing a further deformation edge connected integrally with the ball stud 21 in the area of the opening 33. However, that further deformation edge has not been provided in the example embodiment currently under consideration.

In the overlap area 34 between the ball stud 21 and the annular body 22 when the annular body 22 has been fully pressed home, the surface is provided with an electroplated protective surface coating. The overlap area 34 here corresponds to the height of the annular body 22. The electroplated surface coating in the overlap area 34 protects against corrosion in the circumferential gap created by the clearance fit between the ball stud 21 and the annular body 22. The electroplated surface protection is in the form of a zinc-nickel surface coating.

The annular body 22 is in the form of an extrusion molded component. By designing the annular body as a simple, shaped component it can be produced inexpensively, particularly since no further work step such as an additional turning operation is required. The annular body 22 is provided with an all-over electroplated surface coating in the form of a zinc-nickel surface protective coating. Furthermore, as can be seen in FIG. 4 the annular body 22 has a circumferential outside surface of contact with a first connected component 35, in the form of the outer surface of a truncated cone. The main load acting on the annular body 22 from the first connected component 35 is transferred to the outer diameter area of the contact surface, in order to keep the surface pressure between the annular body 22 and the first connected component low. The first connected component is made of a cast aluminum material. With the material combination of the steel annular body 22 and a first connected component 35 of aluminum, the all-over surface coating of the annular body 22 also serves to avoid contact corrosion in the area of the common contact area, since at that point two different resistant metals are in contact. The first connected component is in the form of a transverse control arm.

The ball joint 20 shown in FIG. 3 has a housing 36 in which a ball stud 21 as described above is held. The ball stud 21 is held in the housing 36 at one end area in such manner that it can rotate and pivot. For that purpose the end area is of spherical shape. The housing has an outer circumferential surface 37 which is suitable for holding the housing 36 in a bore of a second connected component 38. The second connected component is in the form of a wheel carrier 38. By integrating the function "holding the housing 36 in a bore of a second connected component" in the outer circumferential surface 37 of the housing 36, an inexpensive ball joint 20 is obtained. Preferably, the ball stud 21, the annular body 22 and the housing 36 are formed rotationally symmetrically relative to the central axis 24 of the ball stud 21. At one axial end the housing 36 has a circumferential collar, which in the direction of the central axis 24 of the ball stud 21 serves as an abutment for holding the housing 36 in the bore of the wheel carrier 38.

INDEXES

1 Chassis assembly
2 First connected component, aluminum transverse control arm
3 Second connected component, wheel carrier
4 Ball joint
5 Ball stud
6 Annular body
7 Contact surface
11 Ball joint
12 Annular body
13 Deformation edge
14 Ball stud
20 Ball joint
21 Ball stud
22 Annular body
23 Deformation edge
24 Central axis of the ball stud
25 Inside wall of the annular body
26 Groove
27 Sealing bellows
28 Pressing-on direction
29 Oblique face
30 Recess, annular groove
31 Cylindrical area
32 Contact surface
33 Opening
34 Overlap area
35 First connected component, transverse control arm
36 Housing
37 Outer circumferential surface
38 Second connected component, wheel carrier

The invention claimed is:

1. A ball stud for a ball joint, with an annular body, and from an unsecured position of the annular by relative to the ball stud, the annular body being pressed onto the ball stud such that the annular body is held fast onto the ball stud in an axially fixed position by at least one securing element to prevent loosening, the at least one securing element being a deformation edge acting between the ball stud and the annular body, and the at least one deformation edge being made integrally with the ball stud, the ball stud having an axial outer surface that is radially spaced from an axial inner surface of the annular body by a gap, when the annular body is in the axially fixed position, and the deformation edge extends radially from the axial outer surface of the ball stud and contacts the axial inner surface of the annular body, in the axially fixed position of the annular body, such that the deformation edge axially divides the gap.

2. The ball stud according to claim 1, wherein the deformation edge is produced by a chip-removing process, and the deformation edge is annular and has a diameter that is greater than a diameter of the axial outer surface.

3. The ball stud according to claim 1, wherein the deformation edge, when viewed in a longitudinal section extending along a central axis of the ball stud, is shaped like a barbed hook.

4. The ball stud according to claim 3, wherein with the annular body is pressed onto the ball stud in the axially fixed position, the axial outer surface of the ball stud and the axial inner surface of the annular body form a substantially cylindrical area that extends in a direction of the central axis, and the deformation edge is axially located centrally along the cylindrical area.

5. The ball stud according to claim 1, wherein the ball stud has at least one recess axially adjacent the deformation edge that receives at least a part-volume of the deformation edge, when the deformation edge is in a deformed condition, and the annular body is pressed on the ball stud in the axially fixed position.

6. The ball stud according to claim 5, wherein the recess is a circumferential annular groove.

7. The ball stud according to claim 6, wherein the annular groove is shaped tangentially, consistently in an axial direction along a central axis of the ball stud, to avoid a notch effect.

8. The ball stud according to claim 1, wherein the ball stud and the annular body each comprise a truncated outer surface shaped as a truncated cone, and the truncated outer surface of the ball stud and the truncated outer surface of the annular body abut each other when the annular body is pressed into the axially fixed position.

9. The ball stud according to claim 8, wherein the axial outer surface of the ball stud and the axial inner surface of the annular body extend at least substantially parallel and form a cylindrical area that extends along a central axis of the ball stud, and the deformation edge is axially located substantially in a middle of the cylindrical area.

10. The ball stud according to claim 1, wherein the ball stud, after the annular body is fully pressed onto the ball stud, has a surface provided with electroplated surface protection at least in an area of overlap between the ball stud and the annular body.

11. The ball stud according to claim 1, wherein the annular body is an extrusion molded part.

12. The ball stud according to claim 1, wherein the annular body is provided with a surface coating.

13. The ball stud according to claim 1, wherein the annular body has a contact surface with a first connected component, and the contact surface is in a form of an outer surface of one of a truncated cone, a spherical cap and a circular surface.

14. A ball joint having a housing in which a ball stud is held, the ball stud having an annular body pressed into an axially fixed position on the ball stud such that the annular body is held fast to the ball stud by at least one securing element to prevent loosening, the at least one securing element being in a form of a deformation edge acting between the ball stud and the annular body, and the at least one deformation edge being made integrally with the ball stud, the ball stud having an outer surface that is radially spaced from an inner surface of the annular body by a gap when the annular body is in the axially fixed position, and the deformation edge extends radially from the outer surface of the ball stud and contacts the inner surface of the annular body, in the axially fixed position of the annular body, such that the deformation edge axially divides the gap.

15. The ball joint according to claim 14, wherein the housing has an outer circumferential surface which facilitates holding the housing in a bore of a second connected component.

16. A ball stud for a ball joint, the ball stud defining a longitudinal axis, an annular body being pressed along the longitudinal axis in a first axial direction to an axially fixed position on the ball stud, the ball stud having an integrally formed deformation edge that mates with the annular body for preventing movement of the annular body in a second axial direction along the longitudinal axis from the fixed position, the ball stud having a cylindrical outer surface and an abutment surface that projects radially outward from the cylindrical outer surface and mates with a contact surface of the annular body to stop movement of the annular body in the first direction and define the fixed position of the annular body on the ball stud, the annular body having a cylindrical inner surface that surrounds the cylindrical outer surface of the ball stud, the cylindrical inner surface of the annular body having a diametrical dimension that is smaller than a diametrical dimension of the deformation edge such that movement of the annular body, in the first direction along the cylindrical outer surface of the ball stud, deforms the deformation edge, and a diametrical dimension of the cylindrical outer surface of the ball stud is smaller than the diametrical dimension of the cylindrical inner surface of the annular body such that an at least substantially cylindrical gap is formed therebetween, the deformation edge being arranged axially centrally along the cylindrical outer surface of the ball stud, and extending radially to contact the inner surface of the annular body such that the cylindrical gap is axially divided by deformation edge into cylindrical upper and lower portions, the deformation edge having a lower resistance to deformation in the first axial direction than a resistance to deformation in the second axial direction.

* * * * *